United States Patent [19]
Laane et al.

[11] 3,754,234
[45] Aug. 21, 1973

[54] CHARGE PARCELLING INTEGRATOR

[75] Inventors: Rein R. Laane, Wheaton, Ill.; Bernard T. Murphy, New Providence, N.J.

[73] Assignee: Bell Telephone Laboratories, Incorporated, Murray Hill, N.J.

[22] Filed: Oct. 18, 1971

[21] Appl. No.: 190,400

Related U.S. Application Data

[63] Continuation of Ser. No. 884,058, Dec. 11, 1969, abandoned.

[52] U.S. Cl. .......................... 340/347 DA, 325/38 B
[51] Int. Cl. ... H03k 13/22, H03k 13/25, H04b 1/00
[58] Field of Search .................... 340/347; 307/229, 307/246, 234, 270; 328/67, 78, 127; 325/38 B

[56] References Cited

UNITED STATES PATENTS

| | | | |
|---|---|---|---|
| 3,251,052 | 5/1966 | Hoffman et al. | 340/347 C |
| 3,354,449 | 11/1967 | McGregor | 340/347 AD |

*Primary Examiner*—Thomas J. Sloyan
*Attorney*—E. W. Adams, Jr.

[57] ABSTRACT

An integrator network for use in signal conversion systems uses charge parcelling techniques to transmit pulses to the integrating capacitor as quanta of charge. A compensation network corrects imbalances between the input pulses.

6 Claims, 4 Drawing Figures

INVENTORS R.R. LAANE
B.T. MURPHY
BY David P. Kelley
ATTORNEY

CHARGE PARCELLING INTEGRATOR

This application is a continuation of application Ser. No. 884,058, filed Dec. 11, 1969, now abandoned.

BACKGROUND OF THE INVENTION

This invention relates to delta modulation transmission systems and, more particularly, to integrating circuits for use therein.

In recent years, delta modulation systems have found widespread application, chiefly due to their relatively simple implementation and uncomplicated coding scheme. In conventional delta modulation, the analog signal to be encoded is periodically compared with a version of itself which is reconstructed from the encoded signals, and a binary signal which is dependent only on this comparison is emitted. For example, if the comparison reveals that the analog input is greater than the reconstructed signal, a digital pulse is emitted; if the analog input is less than the reconstructed version, a "0," or no pulse, is emitted. After this series of digital ones and zeroes is sent through the tranmission medium, the analog signal is recovered by means of a reconstruction process identical to the one which had been used in the encoder. In particular, the reconstruction technique which is generally utilized in both the encoder and decoder is one of integration of the digital signal to obtain an approximation of the analog signal.

It is quite obvious, then, that the degree of accuracy of the encoding process is only as high as is the performance quality of the integrator in reconstructing the analog approximation from the digital output. Likewise, the quality of the analog output at the receiving end of the system is controlled completely by the ability of the integrator to approximate accurately the analog signal. If the reconstruction process is not an accurate one, a coding error will naturally result. This error is commonly known as quantization noise. A valid indication of the performance of a particular delta modulation system is the degree to which it minimizes quantization noise.

Two approaches are used for reducing quantization noise in delta modulation systems. The first of these seeks to increase the frequency of the periodic comparisons of the analog signal with the reconstructed signal at the integrator output, thus forcing smaller step sizes upon the integrator, and therefore obtaining a more accurate reconstructed signal. Theoretically, if these comparisons were to be made at an infinite rate, the reconstructed signal at the integrator output would be identical to the analog input. It is a well known fact, however, that the comparison rate is limited by the time required to process the effect of the previous comparison function, i.e., comparisons must be spaced in time to allow time for changing the integrator output level and for detecting the difference between the new integrator output and the analog input signal. The second method for reducing quantization noise, improvement of the performance of the integrator, is one which is usually available to the designer. Some aspects of integrator operation which are susceptible to improvement and which, when improved, will contribute noticeably to overall integrator performance, are: First, steady state voltages throughout the integrator circuitry should be relatively free from drift. Second, the integrator circuitry should show reasonable stability with respect to ambient conditions such as temperature and humidity. Third, the reconstructed analog signal from the integrator should be insensitive to the shape of the transmitted digital signal, i.e., the duration and the amplitude of the digital signal.

A standard method for realizing an integrator is described in *Pulse, Digital, and Switching Waveforms* by Millman and Taub, McGraw-Hill, 1965, pages 49 and 50. According to this representation, a low pass RC circuit is used to approximate an integrator. If the RC time constant of the low pass section is very large in comparison with the time required for the input signal (across the RC combination) to make an appreciable change, the circuit approximates an integrator. Under these circumstances, the voltage drop across the capacitor will be very small in comparison with the drop across the resistor and we may consider the total input voltage to appear across $R$. Then the current is $V_{in}/R$, and the voltage across the capacitor ($V_{out}$) may be described by the equation, $$V_{out} = 1/RC \int V_{in} dt \quad (1)$$

Hence, the output is proportional to the integral of the input. Traditionally, this low pass section forms the nucleus of the integrator and is accompanied by extensive supporting circuitry which may include logic gates, multivibrators, and amplifiers.

There are certain functional drawbacks to this method of achieving an integrator. Foremost, the integration process is a direct function of the magnitude of the RC time constant of the integrator and a function of the amount of time allotted to charging and discharging the integrator capacitor. Secondly, the resistor of the low pass circuit must be quite large in order to keep the approximation valid. Thus, this configuration is subject to significant power loss, DC sensitivity, and its application to the integrated circuit art is impractical. Since the configuration is not integrable, it is usually sensitive to ambient conditions such as temperature and humidity.

In order to improve upon these functional drawbacks, the present invention, among other things, eliminates the large resistance, and replaces it with a charge parcelling system. In this manner, some of the notable disadvantages of the RC integrator are overcome and some new advantages accrue.

In an illustrative embodiment of the invention, an integrator is realized by gating input pulses onto an integrating capacitor as quanta of charge. Digital and clock input pulses are first shaped and amplified according to a chosen gain function and are then transmitted to a charge parcelling network. Upon receipt of pulses, the charge parcelling network gates appropriately sized quanta of charge onto or off of the integrating capacitor. Menawhile, a charge compensation network continuously monitors the integrating capacitor voltage and thereby corrects imbalances between the input pulses.

It is a feature of the present invention that the careful control of the charge quanta results in a high degree of accuracy of integration. Moreover, the use of the charge quanta approach allows the implementation of an integrator ideally suited for operation at high comparison rates because performance is insensitive to timing inaccuracies as well as RC time constant problems. Of course, this brings about a substantial reduction of quantization noise when the invention is used in delta modulation systems. In addition, the charge compensation network virtually eliminates DC drift, further improving output accuracy. Finally, the susceptibility of the circuit arrangements to integrated circuitry allows for a reliance on active device matching and component ratios. As will be explained hereinafter, this brings about great stability through a wide range of ambient conditions and keeps power consumption to a minimum.

BRIEF DESCRIPTION OF THE DRAWING

These and other features of the present invention will be more readily apparent from the ensuing detailed description considered in conjunction with the following figures in which.

DETAILED DESCRIPTION

Figure 1:
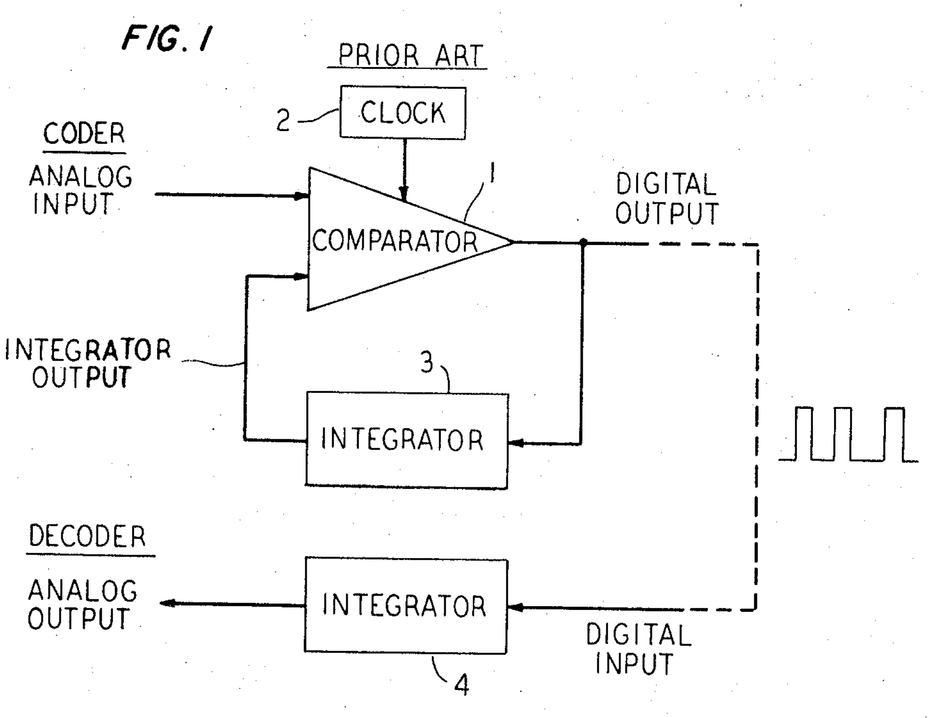
FIG. 1 is a block diagram of a classical delta modulation system.

We turn first to the delta modulation system shown in FIG. 1. It may be seen there that the analog signal input to the encoder is placed directly onto a comparator 1, where it is periodically compared, under the control of pulses from a clock 2, with the output of an integrator 3. The output of the comparator 1 is digital, and represents the encoded analog input signal. This digital output is subsequently placed into the integrator 3 (as well as being transmitted as the encoded signal), which synthesizes an approximation of the analog signal. The decoder of this system simply consists of an integrator 4 which is identical to the integrator 3 of the encoder. Thus, the system analog output signal from the decoder integrator 4 is identical to the synthesized analog approximation from the encoder integrator 3 which is used in the comparator 1. Typically, the encoding operation proceeds as follows: the analog sample, being periodically compared in the comparator 1 with a reconstructed version of itself, causes digital signal pulses to be emitted solely on the basis of its magnitude relative to that of its reconstructed version. For example, if the signal has increased since the previous comparison, a digit "0" is emitted; if it has decreased, a digit "1" is emitted. In this fashion, the digital signal merely represents incremental changes in the analog signal.

Figure 2:
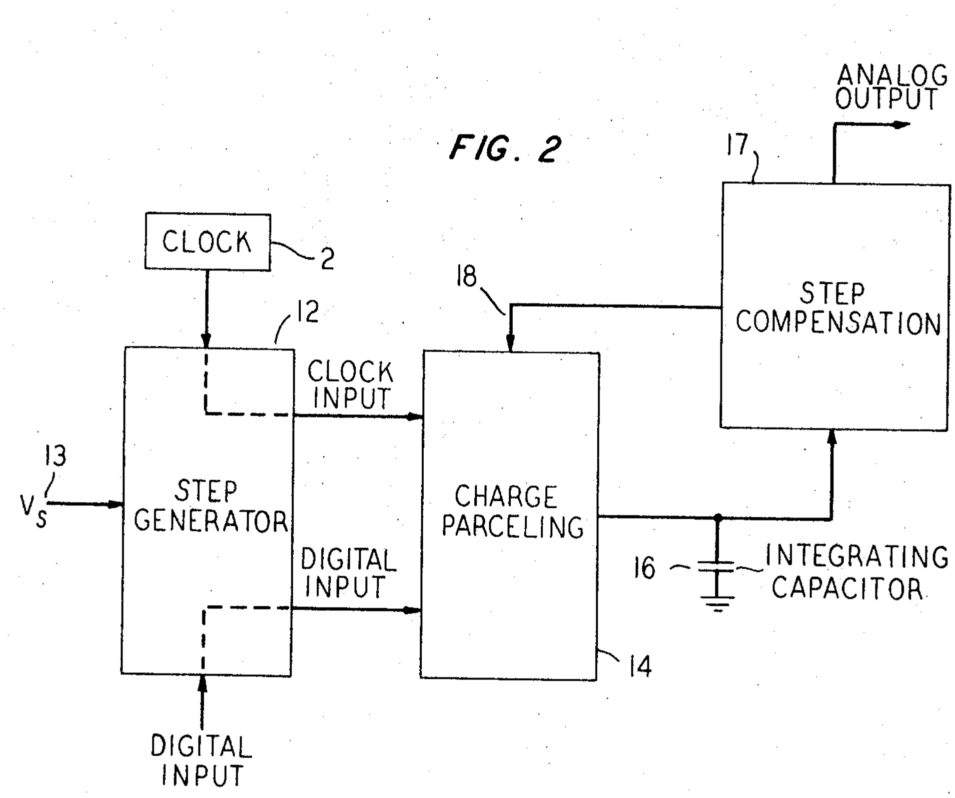
FIG. 2 is a block diagram of an illustrative embodiment of the invention.

We turn now to FIG. 2, which is a block diagram of an integrator which features the principles of the present invention. Therein, pulses from a clock 2 and digital input pulses (from either a comparator or a transmission link) are placed onto separate inputs of a step generator 12. The purpose of this step generator is to produce, upon occurrence of the input pulses, pulses appropriate in shape and proportional in amplitude to a chosen voltage from reference voltage source 13. These shaped pulses are then individually gated onto the charge parcelling network 14. It is the specific function of the charge parcelling network 14 to control the voltage on the integrating capacitor 16. This control is accomplished by placing appropriately sized quanta of charge on the integrating capacitor 16 upon receipt of clock pulses and by removing appropriately sized quanta of charge upon receipt of digital input pulses. The operation of the charge parcelling network 19 will be described more fully hereinafter. Meanwhile, the step compensation network 17 continuously monitors the voltage on the integrating capacitor 16. In response to this monitoring, and by means of a feedback connection 18, the step compensation network 17 controls the size of the quanta of charge which are placed on the integrating capacitor 16. In addition, the analog output voltage of the integrator is taken from an appropriate place in the compensation network 17.

Figure 3:
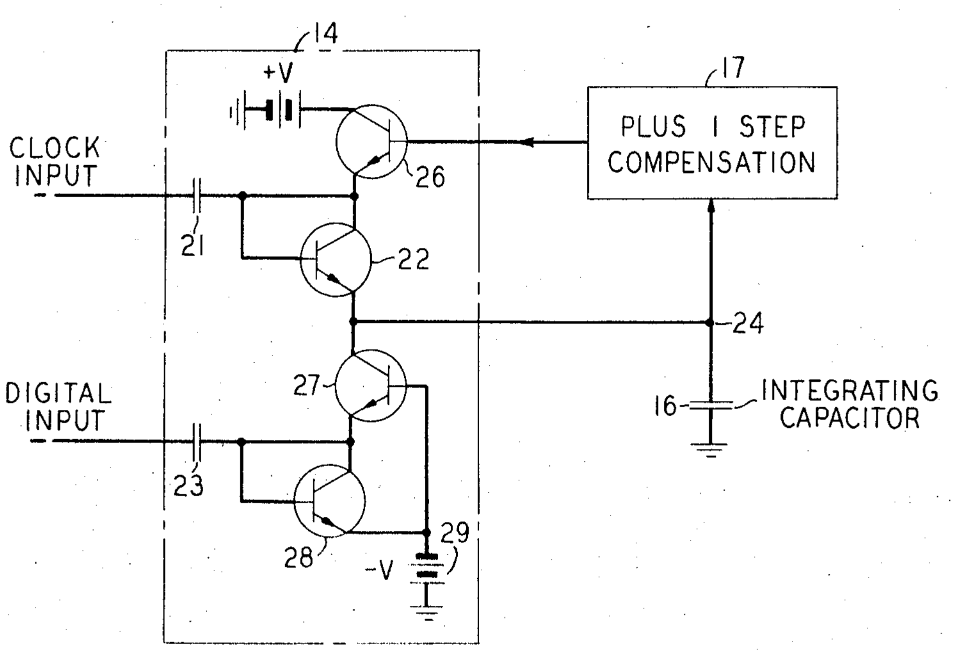
FIG. 3 is a circuit diagram of one segment of the embodiment shown in FIG. 2 and, FIG. 4 is a circuit diagram of another segment of the embodiment shown in FIG. 2.
Figure 4:
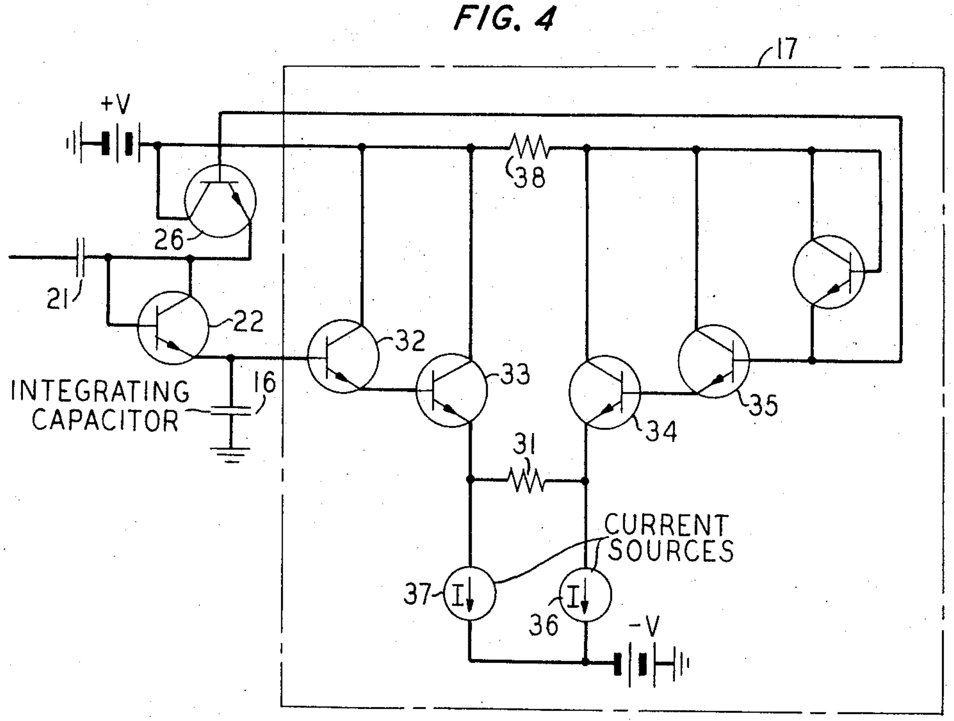

The precise operation of the invention becomes clear upon a detailed investigation of some of the circuitry therein. FIG. 3 shows a circuit diagram for the charge parcelling network 14 and FIG. 4 shows a circuit diagram of the step compensation network 17. The circuit components which appear in both drawings retain the same numbering.

First, we consider the charge parcelling network 14 of FIG. 3. The clock and digital inputs of FIG. 3 are shown as they come from the step generator 12 and thus are assumed to be of appropriate size and shape. It is convenient to consider first the operation of the charge parcelling network for the clock input pulses. These are the pulses which produce the positive integrating steps. Each time a clock pulse hits the integrator, a voltage step is forced onto both sides of the capacitor 21. Since this voltage step exceeds the threshold of transistor-diode 22, transistor 22 turns on and begins conduction. Effectively, capacitors 21 and 16 are then connected, and charge transfers from the input of capacitor 21 to the integrating capacitor 16. The amount of charge which is there transferred is approximately defined by the relation $$Q = C_{21}\Delta V = C_{16}\Delta V_i \quad (2)$$

where, $\Delta V$ is the voltage change on the input capacitor ($C_{21}$) after transistor 22 turns on, and is dependent on the size of the input pulse, $\Delta V_i$ is the resulting voltage change on the integrating capacitor ($C_{16}$), and, $Q$ is the amount of charge which is transferred. $Q$ thus defines the size of a quantum of charge for the integrating steps. As the clock input pulse returns to its original level of zero volts, an equivalent voltage step is forced on both sides of capacitor 21. In turn, this causes transistor 22 to become reverse biased and forces transistor 26 to turn on. The step compensation network 17 translates a voltage approximately equivalent to that on the integrating capacitor 16 to the base of transistor 26. The exact nature of the transfer will be fully described in conjunction with FIG. 4. Thus, since transistor 26 is conducting, capacitor 21 is charged to approximately the voltage on integrating capacitor 16 minus the base to emitter voltage drop of transistor 26. Therefore, the result of a voltage pulse at the clock input is an increase of the voltage on integrating capacitor 16 of $\Delta V_i$:

$$\Delta V_i = C_{21}/C_{21} + C_{16})\ \Delta V \approx (C_{21})/(C_{16})\ \Delta V \quad (3)$$

where the approximation is valid as long as $C_{16}$ is much greater than $C_{21}$. Since the input step on capacitor 21 was originally proportional to the voltage of voltage source 13 of FIG. 2, the voltage source 13 may be conveniently used as a gain control (step size adjustment) for the coding function. Also noteworthy is that the sizes of the integrating voltage steps are proportional to capacitor ratios rather than precise capacitance magnitudes. The voltage step $\Delta V_i$ is also independent of pulse duration provided sufficient time is allowed for the charging and discharging of capacitor 21.

To remove charge from integrating capacitor 16, pulses received at the digital input by the input capacitor 23 are used. The operation of capacitor 23 in conjunction with transistor-diode 28 and transistor 27 is the inverse of that of capacitor 21 with transistor-diode 22 and transistor 26. Charge is drained from capacitor 16 to capacitor 23 through transistor 27 during the negative slope of the digital input signal and capacitor 23 is discharged to the negative supply 29 during the positive slope of the input signal. The circuitry is arranged to remove from the integrating capacitor 16, upon recipt of a digital input, twice the charge that would be added onto the capacitor 16 upon receipt of a clock input pulse (two quanta). Thus, the occurrence of a digital input pulse in conjunction with the next clock input pulse causes one quantum of charge to be added to capacitor 16 and two quanta of charge to be removed therefrom, resulting in a net change of a removal of one quantum of charge. Therefore, each occurrence of a clock input pulse results in a positive voltage step on capacitor 16 and each occurrence of a digital input pulse results in a negative voltage step thereon.

An explanation of the step compensation network 17, the circuitry of which is shown in FIG. 4, is now appropriate. The chief reason that compensation is provided is to prevent the integrator output from drifting to a maximum positive or negative output voltage as a result of differences between the plus and minus integrating steps between encoder and decoder integrators. To match the characteristics between integrators, the compensation function is used in the decoder integrator to provide an automatic adjustment for differences in the ratio of positive and negative step sizes from the encoder. Compensation is not needed on the encoder but is added to help match the two integrator characteristics. Specifically, the compensation network corrects imbalances by controlling the voltage to which the clock input capacitor 21 recharges after receipt of a clock input pulse. A nearly linear compensation characteristic, as a function of the voltage on the integrating capacitor 16, is achieved by the configuration of FIG. 4. Simply put, compensation is achieved by seeking to maintain a voltage balance across resistor 31. It is important to note that transistors 32 and 33 are matched to transistors 35 and 34, respectively. Thus, when no current flows in resistor 31, the voltage on integrating capacitor 16 is transmitted to the base of transistor 26. If a current flows in resistor 31, a voltage imbalance will result, and the voltage on the base of transistor 26 will be the algebraic sum of the voltages on the integrating capacitor 16 and the voltage across resistor 31. Current source 36 and resistor 38 are chosen such that when no current flows in resistor 31, the emitter voltage of transistor 34 is approximately zero. Current source 37 is placed at the emitter of transistor 33 to minimize current drain from capacitor 16. If the ratio of positive and negative integrating steps in the decoder is not balanced to the steps ratio in the encoder, the integrating capacitor voltage will show a corresponding increase or decrease in the decoder. (The voltage on the encoder integrator is not free to change in the encoder and is controlled by the analog input level.) If integrating voltage increases, the voltage at the emitter of transistor 33 increases similarly. A current is thus forced to flow through resistor 31 to satisfy the current source requirements. Therefore, the base of transistor 26 rises appropriately and this difference is reflected in the recharge of the clock input capacitor 21. The opposite happens if the voltage on the integrating capacitor 16 drops, and clock input capacitor 21 is recharged to a comparably lower voltage. Thus, the amount to which the clock input capacitor 21 is recharged after each integrating step becomes a function of the integrator voltage level, decreasing with increasing integrator voltage and increasing with decreasing integrator voltage. The net effect of compensation on the positive step size can be expressed as $$Q' = Q - \Delta V_I\,[1 + (R_{38}/R_{31})]^{-1}\,[C_{21}/(C_{16} + C_{21})] \tag{4}$$

where $Q$ is the quantum size at some integrator voltage $V_I$ and $Q'$ is the quantum size at integrator voltage $V_I + \Delta V_I$. The compensation network, therefore, automatically adjusts the positive step size in the decoder to match the positive to negative step size ratio in the encoder. This correction also tends to minimize variations in steady state conditions throughout the circuitry.

Finally, it is beneficial to clarify the functional interreaction between the circuit designs herein described and their integrated circuit implementation. For a circuit to be amenable to the integrated circuit art, it should be relatively free from passive components, and those passive components which it does have should not be unduly large. It is particularly beneficial for the circuit designs to be as independent as possible of close tolerance component magnitudes (ratio dependent). The circuits which embody the invention obviously fulfill these requirements. On the other hand, if a circuit is integrable, active devices can be quite closely matched. As has been shown, the ability to design for matched transistors and diodes made the charge parcelling and charge compensation operations possible. Thus, the integrable design and the properties of integrated circuits work hand-in-hand to enhance the overall performance of the invention.

The foregoing embodiments of the invention have been intended to illustrate the principles thereof. Numerous other embodiments of these principles may occur to workers skilled in the art without departure from the spirit and scope of the invention.

What is claimed is:

1. A delta modulation decoder for translating digital signal pulses into an analog voltage comprising:

a source of timing pulses occurring at the rate of said digital signal pulses;

a first capacitor, the voltage on said first capacitor representing said analog voltage;

means, responsive to said timing pulses, for increasing the charge stored on said first capacitor, including a second capacitor and a first switching means for coupling said first and second capacitors;

means, responsive to said digital signal pulses, for decreasing the charge stored on said first capacitor, including a third capacitor and a second switching means for coupling said first and third capacitors; and means responsive to the voltage across said first capacitor for regulating a charging of said second capacitor after said second capacitor has been decoupled from said first capacitor;

whereby the coupling of respective capacitors by associated switching means enables the transfer of an amount of charge proportional to the capacitances of said respective capacitors.

2. A delta modulation decoder as described in claim 1 wherein said means for regulating a charging includes:

a resistor;

means responsive to a voltage change on said first capacitor for establishing a current flow in said resistor; and means responsive to the current flow in said resistor for regulating the recharging of said second capacitor after said second capacitor has been decoupled from said first capacitor.

3. A delta modulation decoder as described in claim 1 wherein said means for regulating a charging includes active circuit means for varying the charging of said second capacitor in a manner which is a linear function of voltage changes on said first capacitor, whereby the voltage on said first capacitor is prevented from drifting to voltage extremes otherwise permitted in said decoder.

4. An integration circuit for producing an analog signal in response to clock pulses and a binary signal encoded in delta modulation form with a bit rate equal to the rate of said clock pulses, said integrator circuit comprising: an integrating capacitor; means, responsive to each of said clock pulses, for charging said capacitor; and means responsive to one logical state in said binary signal, for discharging said capacitor by two quanta of charge; characterized in that said means for charging includes a second capacitor having one plate coupled to receive said clock pulses, a unilateral switching means for coupling a second plate of said second capacitor to said integrating capacitor in response to a voltage change produced on said second plate by one of said clock pulses; and mans responsive to said clock pulses and to a stored voltage across said integrating capacitor for charging the second plate of said second capacitor to a potential which is a function of the stored voltage across said integrating capacitor prior to a next coupling by said unilateral switching means; whereby the amount of charge transfered to said integrating capacitor is varied as a function of the voltage of said integrating capacitor.

5. An integrator as described in claim 4 wherein said means for charging the second plate of said second capacitor includes a resistor first circuit means for producing a current flow in said resistor proportional to the voltage change on said integrating capacitor; and second circuit means responsive to said current flow for controlling the voltage accumulated on said second plate of said second capacitor subsequent to each decoupling of said integrating capacitor and said second capacitor.

6. In a system having a source of digital pulses and a source of timing pulses, an integrator network comprising:

an integrating capacitor having a first terminal maintained at a datum voltage;

first and second input capacitors responsive respectively to timing pulses and to digital signal pulses;

a first diode having its anode connected to said first input capacitor and its cathode connected to a second terminal of said integrating capacitor, each one of said timing pulses causing a voltage differential across said first diode sufficient to cause conduction and to enable the transfer of a predetermined quantum of charge from said first input capacitor to said integrating capacitor;

sources of positive and negative potential;

a first transistor having its base connected to said source of negative potential, its collector connected to the second terminal of said integrating capacitor, and its emitter connected to said second input capacitor, each one of said digital signal pulses causing a voltage differential between the base and emitter of said first transistor sufficient to cause conduction and to enable the transfer of two of said predetermined quantum of charge from said integrating capacitor to said second input capacitor;

a second diode having its anode connected to said second input capacitor and its cathode connected to said source of negative potential;

a second transistor having its emitter connected to said first input capacitor and its collector connected to said source of positive potential; and balanced circuit means for producing a voltage proportional to the voltage on said integrating capacitor at the base of said second transistor such that the recharging of said first input capacitor is correspondingly regulated;

whereby the voltage on said integrating capacitor represents an analog voltage which increases upon receipt of clock pulses and decreases upon receipt of digital signal pulses.

* * * * *